(12) United States Patent
Hecht

(10) Patent No.: US 8,695,189 B2
(45) Date of Patent: Apr. 15, 2014

(54) CUTTING TOOL KEY FOR MOUNTING AND EXTRACTING A CUTTING INSERT

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 231 days.

(21) Appl. No.: 13/425,122

(22) Filed: Mar. 20, 2012

(65) Prior Publication Data

US 2013/0167345 A1     Jul. 4, 2013

Related U.S. Application Data

(60) Provisional application No. 61/594,025, filed on Feb. 2, 2012, provisional application No. 61/582,763, filed on Jan. 3, 2012.

(51) Int. Cl.
*B23P 19/04*      (2006.01)
*B23B 25/00*      (2006.01)

(52) U.S. Cl.
USPC ............... 29/267; 29/270; 29/278; 407/110; 407/117

(58) Field of Classification Search
CPC ........ B23B 27/00; B23B 27/04; B23B 25/00; B23B 27/16; B23B 29/00; B25B 27/14; B23P 19/04; B23P 15/28; B23D 15/28
USPC ............. 29/267, 270, 278; 407/110, 117, 72, 407/109, 107, 50; 76/80; 82/160
See application file for complete search history.

(56) References Cited

U.S. PATENT DOCUMENTS

| | | | | |
|---|---|---|---|---|
| 1,029,578 A | * | 6/1912 | MacKay et al. | 29/267 |
| 2,276,348 A | * | 3/1942 | Schisler | 29/270 |
| 2,904,955 A | * | 9/1959 | Kreiter | 59/7 |
| 2,961,756 A | * | 11/1960 | Johnson | 29/235 |
| 3,378,911 A | * | 4/1968 | Clark et al. | 29/267 |
| 3,562,891 A | * | 2/1971 | Earl | 29/221.5 |
| 3,579,797 A | * | 5/1971 | Pepe | 29/267 |
| 3,713,200 A | * | 1/1973 | Burns | 29/267 |

(Continued)

FOREIGN PATENT DOCUMENTS

| | | |
|---|---|---|
| AT | 381262 B | 9/1986 |
| DE | 7415774 U | 8/1975 |
| GB | 2295432 A | 5/1996 |

OTHER PUBLICATIONS

Search Report dated Mar. 8, 2013 issued in European counterpart application (No. 12191576).

*Primary Examiner* — George Nguyen

(74) *Attorney, Agent, or Firm* — Womble Carlyle

(57) ABSTRACT

A cutting tool key is suitable for mounting and extracting a cutting insert into and from an insert receiving slot of a cutting tool holder blade. The key includes an elongated protrusion having first and second engagement portions with a pivot axis formed in the first engagement portion. The insert receiving slot has a holder axis extending in a forward-to-rearward direction, and a clamping-jaw surface facing a base-jaw surface. The base jaw surface has a holder-passage opening out to the holder's side surfaces, and the insert has an insert-passage opening out to the insert's lateral surfaces. The first and second engagement portions engage the holder-passage and insert-passage, respectively, with the pivot axis in the holder-passage. Rotating the key in an extraction direction about the pivot axis applies extraction-force on the insert. Rotating the key in a mounting direction, opposite to the extraction direction, applies a mounting-force on the insert.

20 Claims, 3 Drawing Sheets

(56) References Cited

U.S. PATENT DOCUMENTS

| | | | |
|---|---|---|---|
| 3,724,056 A * | 4/1973 | Antal | 29/253 |
| 3,736,643 A * | 6/1973 | Pepe | 29/267 |
| 4,588,333 A * | 5/1986 | Gustafson | 407/117 |
| 4,664,564 A | 5/1987 | Loqvist | |
| 5,795,109 A * | 8/1998 | Jonsson et al. | 407/72 |
| 5,899,643 A * | 5/1999 | Oehler | 407/110 |
| 5,980,165 A * | 11/1999 | Hansson et al. | 407/107 |
| 6,052,881 A * | 4/2000 | Vuorinen et al. | 29/267 |
| 6,065,906 A * | 5/2000 | Hansson | 407/110 |
| 6,454,498 B1 | 9/2002 | Hansson et al. | |
| 6,565,292 B2 | 5/2003 | Hecht | |
| 6,572,309 B2 * | 6/2003 | Hansson et al. | 407/72 |
| 7,331,096 B2 | 2/2008 | Kugler et al. | |
| 7,524,147 B2 | 4/2009 | Hecht | |
| RE43,718 E * | 10/2012 | Friedman | 82/160 |
| 2002/0081165 A1 | 6/2002 | Hecht | |
| 2006/0062640 A1 | 3/2006 | Kugler et al. | |
| 2013/0170918 A1* | 7/2013 | Hecht | 407/110 |

\* cited by examiner

CUTTING TOOL KEY FOR MOUNTING AND EXTRACTING A CUTTING INSERT

RELATED APPLICATIONS

This application claims priority to U.S. Provisional Patent Application No. 61/582,763, filed 3 Jan. 2012 and also to U.S. Provisional Patent Application No. 61/594,025, filed 2 Feb. 2012. The contents of the above-identified applications are incorporated by reference in their entirety.

FIELD OF THE INVENTION

The present invention relates to cutting tools, in which a cutting insert is removably secured in a holder blade by a resilient clamping force, in general, and to a cutting tool key for mounting and extracting a cutting insert into and from such a holder blade, in particular.

BACKGROUND OF THE INVENTION

Cutting tools for grooving and parting where the cutting insert is removably secured in a holder blade by a resilient clamping force can be extracted from the holder blade with the aid of a key. An example of such a clamping mechanism is disclosed in U.S. Pat. No. 7,524,147.

Examples of such cutting inserts and extraction keys are disclosed in U.S. Pat. Nos. 4,664,564, 7,331,096, 5,795,109, 6,454,498, 5,899,643 and 6,565,292.

It is an object of the subject matter of the present application to provide an improved novel key for mounting and extracting a cutting insert from an insert receiving pocket of a holder blade.

SUMMARY OF THE INVENTION

In accordance with the subject matter of the present application, there is provided a cutting tool key for mounting and extracting a cutting insert into and from a cutting tool holder blade, the cutting insert having an insert lower surface and two opposing lateral surfaces, the holder blade having two side surfaces and an insert receiving slot. The insert receiving slot has a holder longitudinal axis extending in a forward to rearward direction, and a clamping jaw upper surface facing towards a base jaw lower surface, for resiliently clamping the cutting insert therebetween. The key comprises:

a protrusion having a first and a second engagement portion; and a single pivot axis;

wherein the base jaw lower surface has a holder passage opening out to at least one of the two side surfaces, and the cutting insert has an insert passage opening out to the insert lower surface and to at least one of the opposing lateral surfaces, wherein the key is positioned relative to the cutting tool such that the first and second engagement portions simultaneously engage the holder passage and the insert passage, respectively, and the pivot axis is located in the holder passage, wherein rotation of the key in a extraction direction about the pivot axis applies an extraction force on the cutting insert, and moves the cutting insert in the forward direction, and wherein rotation of the key in a mounting direction about the pivot axis, the mounting direction being opposite the extraction direction, applies a mounting force on the cutting insert, and moves the cutting insert in the rearward direction.

In accordance with the present application, there is also provided a cutting tool key suitable for mounting and extracting a cutting insert into and from an insert receiving slot of a cutting tool holder blade, the key comprising:

a handle having a longitudinally extending handle axis;

a protrusion connected to the handle and protruding in a first direction transverse to the handle axis, the protrusion having a peripheral surface and being elongated along a main protrusion axis which is transverse to the first direction in which the protrusion protrudes, the protrusion comprising first and second engagement portions and a connecting neck portion arranged along the main protrusion axis;

a pivot axis formed in the first engagement portion, the pivot axis intersecting the main protrusion axis (P) and being transverse to the handle axis;

wherein:

the first and second engagement portions and the connecting neck portion have unitary one-piece construction, share the peripheral surface of the protrusion and are fixed relative to the handle axis.

BRIEF DESCRIPTION OF THE FIGURES

For a better understanding of the present application and to show how the same may be carried out in practice, reference will now be made to the accompanying drawings, in which.

Figure 1:
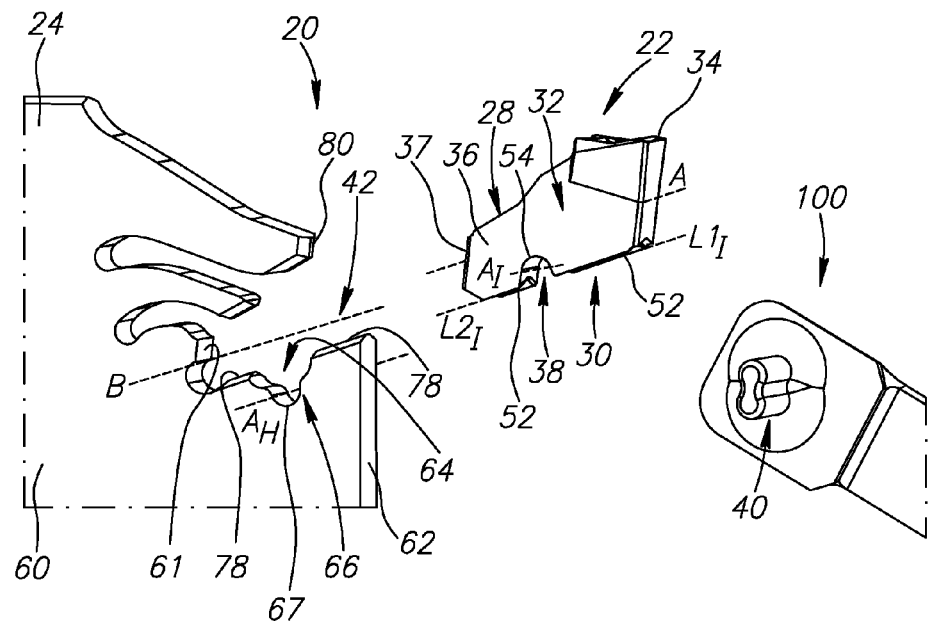
FIG. 1 is a perspective view of a key for cutting insert extraction and mounting, in accordance with a first embodiment of the present application, with a cutting tool and a cutting insert.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the present invention. However, it will also be apparent to one skilled in the art that the subject matter of the present invention can be practiced without the specific configurations and details presented herein.

Figure 2:
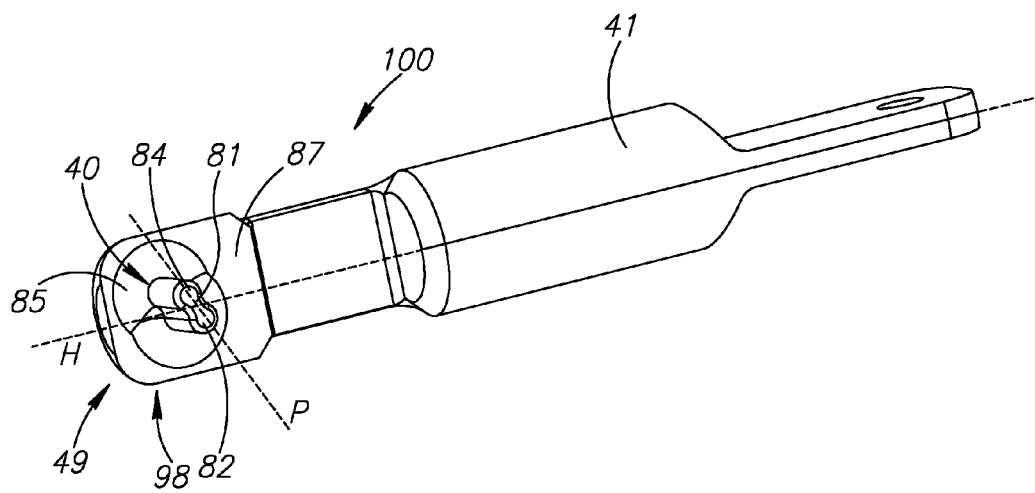
FIG. 2 is a perspective detailed view of the key shown in FIG. 1.

Attention is first drawn to FIGS. 1 and 2 depicting a cutting tool 20 of the blade-type and a cutting tool key 100, in accordance with an embodiment of the disclosed technique. The cutting tool 20 has a cutting insert 22 used for grooving or parting operations, having an insert longitudinal axis A and a holder blade 24 having a holder longitudinal axis B, where the cutting insert 22 can be secured into the holder blade 24 by means of a resilient clamping force. The mounting (or insertion) of cutting insert 22 is initiated by the rotation of the key 100 in a mounting direction $D_M$, and the extraction of cutting insert 22 from cutting tool 20 is achieved by the rotation of the key 100 in an extraction direction $D_E$, opposite to the mounting direction $D_M$. It should be appreciated that use of the terms "forward" and "rearward" throughout the description and claims refer to a relative position in a direction of the insert and holder longitudinal axis A, B generally towards the right and left, respectively.

The key 100 includes an elongated handle 41 having a longitudinally extending handle axis H and a protrusion 40 connected to the handle 41. The protrusion 40 protrudes in a first direction transverse to the handle axis H. In the shown embodiment, the protrusion 40 is formed in a body 98 of the key 100, adjacent to an end portion 49 of key 100 (e.g., the protrusion 40 may be formed by machining of a metal workpiece). It is noted, however, that the protrusion 40 may alternatively be formed in any other location along the body 98 of the key 100 (i.e., not necessarily adjacent the end portion 49 thereof).

The protrusion 40 has a peripheral surface 86 and is elongated along a main protrusion axis P which is transverse to the direction in which the protrusion 40 protrudes. The protrusion 40 comprises a first and a second engagement portions 82, 84 and a connecting neck portion 81 arranged along the main protrusion axis P. The first and second engagement portions 82, 84 and the connecting neck portion 81 have unitary one-piece construction, share the peripheral surface 86 of the protrusion 40, and are fixed relative to the handle axis H.

Protrusion 40 is surrounded by a groove 85, grooved into the body 98 of key 100. The groove 85 is surrounded by a planar key surface 87. According to the disclosed technique, protrusion 40 has a cross section of a substantially lemniscate shape (i.e., peanut shape, or figure-eight shape), when viewed in a side view of the key 100, perpendicular to main protrusion axis P.

Figure 4:
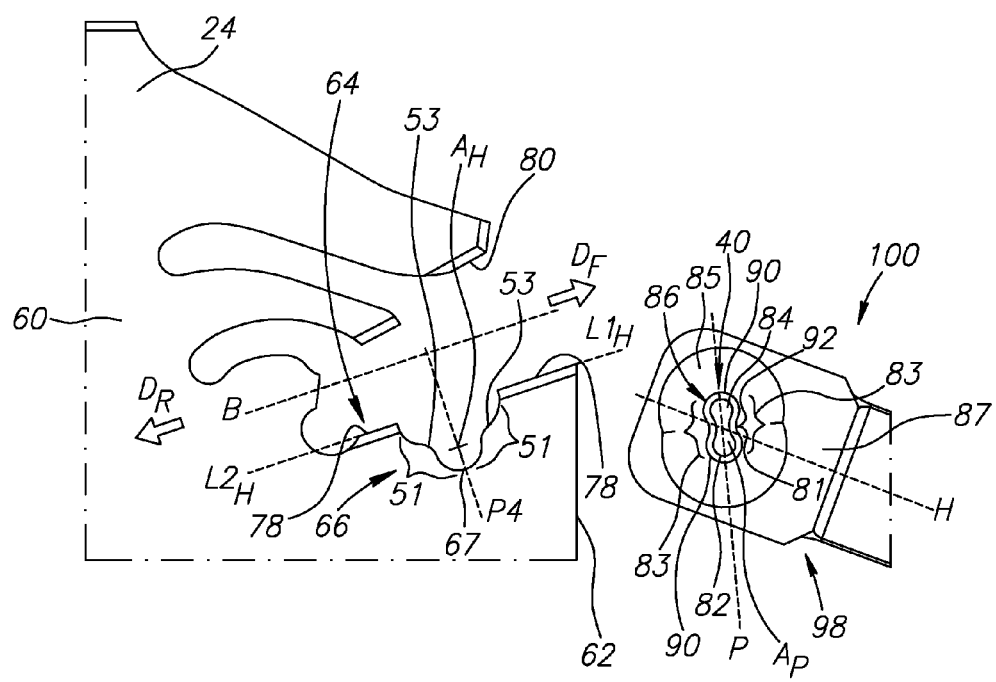
FIG. 4 is a detailed side view of the key and the tool holder shown in FIG. 1.

As depicted in FIG. 4, in the side view of the key 100, the handle axis H is seen to pass through the protrusion 40 and, in particular, through the connecting neck portion 81. It is understood, however, that in some embodiments the handle axis H may not pass through the protrusion 40 at all. Additionally, in some other embodiments, the handle axis H may not only pass through the protrusion 40 but may coincide with the main protrusion axis P in a side view of the key 100.

As further depicted in FIG. 4, the first and second engagement portions 82, 84 are round contoured, coupled by the connecting neck portion 81. The connecting neck portion 81 which couples the first and second engagement portions 82, 84, provides protrusion 40 with greater resilience and durability under mechanical pressure (i.e., compared to a possible different structure of the key's protrusion having two separate adjacent engagement portions or prongs).

The cutting insert 22 includes opposing insert upper and lower surfaces 28, 30 with a peripheral surface 32 extending therebetween. A cutting edge 34 is associated with the insert upper surface 28. The peripheral surface 32 has two opposing lateral surfaces 36, and an insert back surface 37. The insert lower surface 30 includes at least one longitudinally extending lower clamping portion 52, where each lower clamping portion 52 contains an associated linear insert imaginary line $L1_I$, $L2_I$ parallel to the insert longitudinal axis A. In accordance with some embodiments of the disclosed technique, the insert lower surface 30 may have two lower clamping portions 52, and the two respective linear insert imaginary lines $L1_I$, $L2_I$ may be co-axial.

An insert passage 38 extends along an insert passage axis $A_I$ and opens out to the insert lower surface 30 and to at least one of the opposing lateral surfaces 36. The purpose of the insert passage 38 is to provide a location for an engagement portion of protrusion 40 of key 100 to engage the cutting insert 22 such that a mounting force or an extraction force may be applied for mounting or extraction of cutting insert 22 to and from an insert receiving slot 42 by rotation of the key 100.

Figure 3A:
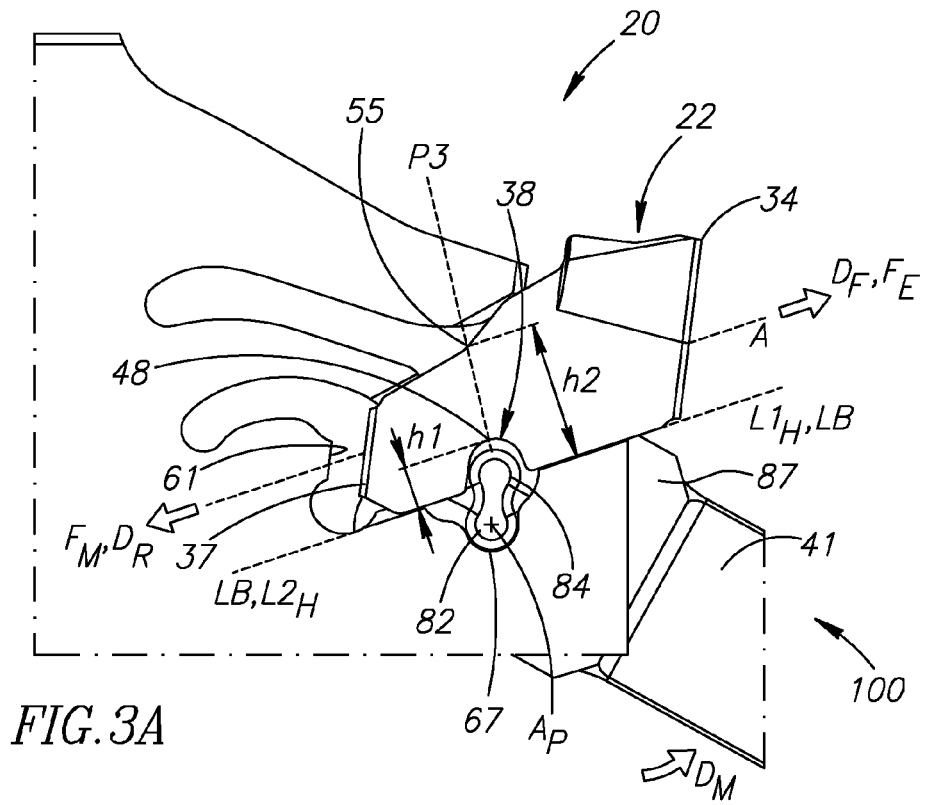
FIG. 3A is a side view of the cutting tool shown in FIG. 1, with the cutting insert located in a released position, and the key engaged.
Figure 3B:
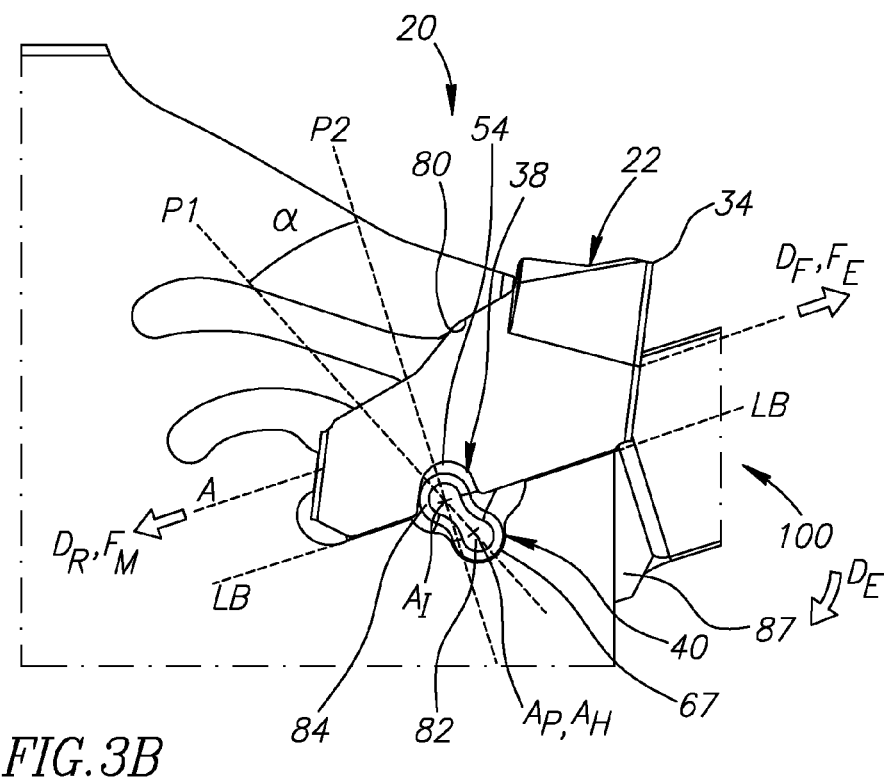
FIG. 3B is a side view of the cutting tool shown in FIG. 1, with the cutting insert located in a clamped position, and the key engaged.

Reference is further made to FIGS. 3A and 3B, depicting the key 100 engaging the cutting tool 20 and cutting insert 22, in a released and a clamped position, respectively, and to FIG. 4, depicting the holder blade 24 and the key 100, in detailed side view. The insert passage 38 includes a curved portion 54 having a substantially constant radius (not shown). The distance between the upwardmost point 48 of insert passage 38 and the downwardmost insert imaginary line $L1_I$, $L2_I$, is denoted by an insert passage height h1. A plane P3 perpendicular to insert longitudinal axis A and containing the insert passage upwardmost point 48, intersects the insert upper surface 28 at an intersection point 55, in a side view of the cutting insert 22. The distance between the intersection point 55 and the downwardmost insert imaginary line $L1_I$, $L2_I$ is denoted by an insert height h2.

In accordance with some embodiments of the disclosed technique, the magnitude of the insert passage height h1 is at least one quarter the magnitude of the insert height h2 (i.e., the maximum height of the insert passage 38 may be at least one quarter the height of the cutting insert 22, when measured parallel to the plane P3).

The holder blade 24 includes two opposing side surfaces 60, a blade back surface 61, and the insert receiving slot 42 that opens out to a holder front end surface 62 of the holder blade 24. The insert receiving slot 42 has a base jaw lower surface 64 and a clamping jaw upper surface 80 facing towards the base jaw lower surface 64, and the cutting insert 22 is resiliently clamped between the clamping jaw upper surface 80 and the base jaw lower surface 64.

The holder longitudinal axis B extends in a forward to rearward direction $D_F$, $D_R$. A holder passage 66 extends along a holder passage axis $A_H$, and opens out to the base jaw lower surface 64 and to at least one of the two side surfaces 60. The holder passage 66 may include a curved portion 67 having a substantially constant radius (not shown). The first and second engagement portions 82, 84 may have substantially round shapes, for fitting into, and rotating along, the curved portions 54, 67. In accordance with some embodiments of the disclosed technique, the holder passage 66 extends between, and opens out to, both of the side surfaces 60. When the key 100 engages cutting insert 22 and holder blade 24, groove 85 of key 100 allows for planar key surface 87 to flatly abut against one of the side surfaces 60 of cutting tool 20 and against one of the opposing lateral surfaces 36 of the cutting insert 22.

The base jaw lower surface 64 includes at least one longitudinally extending base jaw clamping portion 78, where each base jaw clamping portion 78 contains a linear holder imaginary line $L1_H$, $L2_H$ parallel to the holder longitudinal axis B. In accordance with some embodiments of the disclosed technique, the base jaw lower surface 64 includes two base jaw clamping portions 78, and the two respective linear holder imaginary lines $L1_H$, $L2_H$ may be co-axial.

The key 100 is employed to transfer the cutting insert 22 from a clamped position (FIG. 3B) to a released position (FIG. 3A) and vice versa. It is noted that when the cutting insert 22 is located within the insert receiving slot 42, either in a clamped or a released position, the insert passage 38 is located adjacent to the holder passage 66. In particular, the insert passage 38 is located such that it opens out to at least a portion of the holder passage 66, thereby enabling protrusion 40 of key 100 to simultaneously engage the insert passage 38 and the holder passage 66.

Now referring to FIG. 3B, the at least one lower clamping portion 52 is in clamping contact with the at least one base jaw clamping portion 78 (i.e., cutting insert 22 is in the clamped position) and the cutting insert 22 is located in a rearmost position in the insert receiving slot 42. Due to the clamping contact between the insert's lower clamping portion 52 and the holder blade's base jaw clamping portion 78, the cutting insert 22 and the holder blade 24 form an imaginary border line LB where the cutting insert and the holder blade appear to meet, in a side view of the cutting tool 20, taken perpendicular to side surface 60. It is understood, however, that the insert's lower clamping portion 52 and the holder blade's base jaw clamping portion 78 are typically provided with complementary surfaces, such as mating V-shaped grooves, and so the imaginary border line LB does not necessarily represent the location of an actual abutment interface between the cutting insert 22 and the holder blade 24.

A main plane P2 oriented perpendicularly to the insert longitudinal axis A contains the insert passage axis $A_I$. As shown in FIG. 3B, the main plane P2 is perpendicular to the imaginary border line LB. A passage plane P1 that contains the holder passage axis $A_H$ and the insert passage axis $A_I$ forms a first angle α with the main plane P2, and the first angle α is less than or equal to 60°. The holder longitudinal axis B is parallel to the insert longitudinal axis A.

In accordance with some embodiments of the disclosed technique, the first angle α may be less than or equal to 30°. The holder passage axis $A_H$ may lie forward of the insert passage axis $A_I$.

The cutting tool key 100 further includes a single pivot axis $A_P$, located at the center of the first engagement portion 82. As best seen in FIG. 4, the pivot axis $A_P$ intersects the main protrusion axis P and is transverse to the handle axis H. The key 100 is positioned such that the first and second engagement portions 82, 84 simultaneously engage the holder passage 66 and the insert passage 38, respectively, and the pivot axis $A_P$ is located in the holder passage 66. The key 100 is rotated in the extraction direction $D_E$ about the pivot axis $A_P$ to apply an extraction force $F_E$ on the cutting insert 22 in the forward direction $D_E$.

After the first and second engagement portions 82, 84 are positioned in the holder and insert passages 66, 38 respectively, insert passage 38 is shaped and sufficiently sized relative to the second engagement portion 84 to provide freedom for the latter (and thus the entire protrusion 40) to be displaced in the direction parallel to the passage plane P1, such that no resistive downward force is encountered by the second engagement portion 84 during the rotating of the key 100.

The pivot axis $A_P$ may be parallel to the holder and insert passage axes $A_H$, $A_I$. Further, the pivot axis $A_P$ may coincide with the holder passage axis $A_H$, when the second engagement portion 84 is located within, and engages with, holder passage 66. Rotation of the key 100 about the pivot axis $A_P$ may be performed until there is a resistive contact between the second engagement portion 84 and the base jaw lower surface 64 or the holder passage 66, preventing further rotation. Alternatively, the operator of cutting tool 20 may rotate key 100 until it is determined that the cutting insert 22 is no longer in the clamped position. In this position the cutting insert 22 is said to be in the released position and it is no longer resiliently clamped in the holder blade 24.

Now referring to FIG. 3A, the cutting insert 22 is in the released position, and is to be transferred to the clamped position. The key 100 is positioned such that the first and second engagement portions 82, 84 simultaneously engage the holder passage 66 and the insert passage 38, respectively, and the pivot axis $A_P$ is located in the holder passage 66. The key 100 is rotated in the mounting direction $D_M$, opposite to the extraction direction $D_E$, about the pivot axis $A_P$, to apply a mounting force $F_M$ on the cutting insert 22 in the rearward direction $D_R$.

After the first and second engagement portions 82, 84 are positioned in the holder and insert passages 66, 38 respectively, insert passage 38, due to its shape and size, provides freedom for the second engagement portion 84 to be displaced, such that no resistive downward force is encountered by the second engagement portion 84 during the rotating of the key 100.

Rotation of the key 100 about the pivot axis $A_P$ in the mounting direction $D_M$, may be performed until there is a resistive contact between the second engagement portion 84 and the base jaw lower surface 64 or the holder passage 66, preventing further rotation. Such resistive contact may also be transferred from resistive contact between the insert back surface 37 of the cutting insert 22, and the blade back surface 61 of holder blade 24. In this position the cutting insert 22 is said to be in the clamped position, in which it is resiliently clamped in the holder blade 24, and ready to be employed in machining operations.

Reference is now made to FIG. 4, depicting a detailed side view of holder blade 24 and key 100, taken perpendicularly to side surfaces 60 and to planar key surface 87. Holder passage 66 can have mirror symmetry about a holder passage symmetry axis P4, which is perpendicular to linear holder imaginary lines $L1_H$, $L2_H$, and intersects with holder passage axis $A_H$. The sides of holder passage 66 can be formed of two identical wavy holder lines 51, extending from the curved portion 67 towards the base jaw lower surface 64. Each of wavy holder lines 51 has a curved projection 53, substantially at the center thereof.

In the depicted side view of key 100, protrusion 40 is shown to be formed of two identical protrusion wavy contours 83, including two wide sections 90 corresponding to the engagement portion 82, 84 and a narrower section 92 corresponding to the connecting neck portion 81. The shape of each protrusion wavy contour 83 conforms to the shape of a respective one of wavy holder lines 51 of holder passage 66. In particular, connecting neck portion 81 of protrusion 40 is shaped to fit onto curved projection 53 of holder passage 66, and allow entry of curved projection 53 into narrower section 92 of protrusion wavy contour 83. Further, the first and second engagement portions 82, 84 are formed with round contours, for fitting into the curved portion 67 of the holder passage 66, and partially fitting into the other end of wavy holder lines 51, adjacent base jaw lower surface 64, as well as into the curved portion 54 of insert passage 38.

The shape of protrusion wavy contours 83, and the conforming shape of holder wavy lines 51, allow for key 100 to be rotated by a greater amount about pivot axis $A_P$ (i.e., when pivot axis $A_P$ is located within holder passage 66), before being prevented from further rotation due to contact with holder passage 66. With reference to FIG. 3B, the angle α may be greater due to the shape of protrusion wavy contours 83 and holder wavy lines 51. In particular, the narrower section 92 of protrusion wavy contour 83, respective of connecting neck portion 81, allows for rotation of key 100, despite the presence of curved projection 53 of holder passage 66, as best depicted in FIGS. 3A and 3B (i.e., curved projection 53 fits into narrower section 92).

It should be understood, that embodiments having the curved projection 53, can reduce the amount of matter removed from base jaw lower surface 64, when forming holder passage 66, to a minimum (i.e., compared to other embodiments in which the sides of the holder passage would have been formed as straight lines, conforming to a possible contour of corresponding other embodiments in which the key's protrusion has an oval cross-section with straight sides, instead of wavy sides, and the connecting neck portion is not narrowed). In this manner, the amount of matter removed while forming the holder passage 66 is minimal, and the base jaw lower surface 64 has greater resilience and durability under mechanical pressure.

It should be noted that a feature of the disclosed technique is that there is no requirement for a recess at the rear of the insert receiving slot 42 to accommodate an engagement portion of the key 100 for extracting the cutting insert 22 from the cutting tool 20. The absence of such a recess allows the clamping jaw upper surface 80 to have increased resilience with respect to the base jaw lower surface 64, thereby providing greater clamping forces. Furthermore, the engagement portions 82, 84 of the key 100 apply the extraction or mounting force $F_E$, $F_M$, through insert passage 38, i.e., in a location on cutting insert 22, distant from cutting edge 34, thereby avoiding possible mechanical damage to cutting edge 34, which may rise when pressure is applied in the vicinity of the cutting edge 34.

Another feature of disclosed technique is that, when extracting the cutting insert 22 from the cutting tool 20 with the key 100 and applying extraction force $F_E$ on the insert passage 38, the cutting insert 22 can be ejected from the insert receiving slot 42 in a controlled manner, for example by an operator. This is achieved since, when rotating the key 100 in the extraction direction $D_E$ in order to extract the cutting insert 22, the second engagement portion 84 of the extraction key 100 comes into resistive contact with the base jaw lower surface 64 or the holder passage 66 (see FIG. 3B). This contact prevents the key 100 from being rotated further and occurs while the cutting insert 22 is still partially located in the insert receiving slot 42. At this point, the key 100 can be disengaged from the cutting tool 20 so that the cutting insert 22 can be completely removed from the holder blade 24 in a controlled manner, rather than being fully ejected from the holder blade 24 upon rotation of the cutting tool key 100 in the extraction direction $D_E$.

Although the subject matter of the present application has been described to a certain degree of particularity, it should be understood that various alterations and modifications could be made without departing from the spirit or scope of the invention as hereinafter claimed.

What is claimed is:

1. A cutting tool key (100) for mounting and extracting a cutting insert (22) into and from a cutting tool holder blade (24), the cutting insert having an insert lower surface (30) and two opposing lateral surfaces (36), the holder blade (24) having two side surfaces (60) and an insert receiving slot (42), the insert receiving slot (42) having a holder longitudinal axis (B) extending in a forward to rearward direction ($D_F$, $D_R$), and a clamping jaw upper surface (80) facing towards a base jaw lower surface (64), for resiliently clamping the cutting insert (22) therebetween, the cutting tool key (100) comprising:
   a protrusion (40) having a first and a second engagement portion (82, 84); and
   a single pivot axis ($A_P$);
   wherein the base jaw lower surface (64) has a holder passage (66) opening out to the base jaw lower surface (64) and to at least one of the two side surfaces (60), the cutting insert (22) has an insert passage (38) opening out to the insert lower surface (30) and to at least one of the opposing lateral surfaces (36), and when the cutting insert (22) is located within the insert receiving slot (42), the insert passage (38) is adjacent to the holder passage (66),
   wherein the cutting tool key (100) is positioned such that the first and second engagement portions (82, 84) simultaneously engage the holder passage (66) and the insert passage (38), respectively, and the pivot axis ($A_P$) is located in the holder passage (66),
   wherein rotation of the cutting tool key (100) in an extraction direction ($D_E$) about the pivot axis ($A_P$) applies an extraction force ($F_E$) on the cutting insert (22), moving the cutting insert (22) in the forward direction ($D_F$), and
   wherein rotation of the cutting tool key (100) about the pivot axis ($A_P$) in a mounting direction ($D_M$) opposite the extraction direction ($D_E$), applies a mounting force ($F_M$) on the cutting insert (22), moving the cutting insert (22) in the rearward direction ($D_R$).

2. The cutting tool key (100) according to claim 1, wherein the holder passage (66) extends along a holder passage axis ($A_H$), the insert passage (38) extends along an insert passage axis ($A_I$), and the pivot axis ($A_P$) is parallel to the holder and insert passage axes ($A_H$, $A_I$).

3. The cutting tool key (100) according to claim 2, wherein the pivot axis ($A_P$) coincides with the holder passage axis ($A_H$), when the second engagement portion (84) engages the holder passage (66).

4. The cutting tool key (100) according to claim 1, wherein the key (100) is rotated about the pivot axis ($A_P$) until resistive contact between the second engagement portion (84) and the base jaw lower surface (64) or the holder passage (66) prevents further rotation.

5. The cutting tool key (100) according to claim 1, wherein the key (100) is rotated about the pivot axis ($A_P$) until the cutting insert (22) is no longer resiliently clamped in the insert receiving slot (42).

6. The cutting tool key (100) according to claim 1, wherein each of the holder passage (66) and the insert passage (38) includes a curved portion (54, 67) having a substantially constant radius, and wherein each of the first and second engagement portions (82, 84) has a substantially round contour, for fitting into either one of the curved portions (54, 67).

7. The cutting tool key (100) according to claim 6, wherein the protrusion (40) has a peanut-shape cross section, having round first and second engagement portions (82, 84), and a connecting neck portion (81), located between the first and second engagement portions (82, 84).

8. The cutting tool key (100) according to claim 7, wherein the protrusion (40) has two identical wavy contours (83), each wavy contour (83) including two wide sections (90), corresponding to the first and second engagement portions (82, 84), coupled by a narrower section (92), corresponding to the connecting neck portion (81), and
   wherein the longitudinal cross section of the holder passage (66) has two identical holder wavy lines (51), extending from the curved portion (67) towards the base jaw lower surface (64), each wavy holder line (51) has a curved projection (53) substantially at the center thereof, such that the shape of each wavy holder line (51) conforms to the shape of a respective one of the protrusion wavy contours (83).

9. The cutting tool key (100) according to claim 1, further comprising a groove (85), grooved into a body (98) of the key (100) and surrounding the protrusion (40).

10. The cutting tool key (100) according to claim 9, further comprising a planar key surface (87), surrounding the groove (85), wherein the planar key surface (87) abuts against one of the side surfaces (60) of the holder blade (24) and against one of the opposing lateral surfaces (36) of the cutting insert (22).

11. The cutting tool key (100) according to claim 1, wherein when the cutting insert (22) is placed within the insert receiving slot (42), the insert passage (38) opens out to at least a portion of the holder passage (66), thereby enabling the protrusion (40) of the key (100) to simultaneously engage the insert passage (38) and the holder passage (66).

12. A cutting tool key (100) suitable for mounting and extracting a cutting insert (22) into and from an insert receiving slot (42) of a cutting tool holder blade (24), the key (100) comprising:
    a handle (41) having a longitudinally extending handle axis (H);
    a protrusion (40) connected to the handle (41) and protruding in a first direction transverse to the handle axis (H), the protrusion (40) having a peripheral surface (86) and being elongated along a main protrusion axis (P) which is transverse to the first direction in which the protrusion protrudes, the protrusion (40) comprising first and second engagement portions (82, 84) and a connecting neck portion (81) arranged along the main protrusion axis (P);
    a pivot axis ($A_P$) formed in the first engagement portion (82), the pivot axis ($A_P$) intersecting the main protrusion axis (P) and being transverse to the handle axis (H);
    wherein:
    the first and second engagement portions (82, 84) and the connecting neck portion (81) have unitary one-piece construction, share the peripheral surface (86) of the protrusion (40) and are fixed relative to the handle axis (H).

13. The cutting tool key (100) according to claim 12, wherein each of the first and second engagement portions (82, 84) has a substantially round contour.

14. The cutting tool key (100) according to claim 12, wherein the protrusion (40) has two identical protrusion wavy contours (83), each wavy contour (83) including two wide sections (90), corresponding to the first and second engagement portions (82, 84), coupled by a narrower section (92), corresponding to the connecting neck portion (81).

15. The cutting tool key (100) according to claim 12, further comprising a groove (85), grooved into a body (98) of the cutting tool key (100) and surrounding the protrusion (40).

16. The cutting tool key (100) according to claim 15, further comprising a planar key surface (87) surrounding the groove (85).

17. The cutting tool key (100) according to claim 12, wherein:
    the handle axis (H) passes through the protrusion (40), in a side view of the key.

18. The cutting tool key (100) according to claim 17, wherein:
    the handle axis (H) passes through the neck portion (81) of the protrusion (40), in a side view of the key.

19. The cutting tool key (100) according to claim 12, wherein:
    each of the first and second engagement portions (82, 84) has a substantially round contour;
    the protrusion (40) has two identical protrusion wavy contours (83), each wavy contour (83) including two wide sections (90), corresponding to the first and second engagement portions (82, 84), coupled by a narrower section (92), corresponding to the connecting neck portion (81); and
    the handle axis (H) passes through the protrusion (40), in a side view of the key.

20. The cutting tool key (100) according to claim 19, wherein:
    a groove (85) is grooved into a body (98) of the key (100) and surrounds the protrusion (40); and
    a planar key surface (87) surrounds the groove (85).

* * * * *